United States Patent [19]

Spies et al.

[11] 4,410,875
[45] Oct. 18, 1983

[54] RELEASING CIRCUIT AND CHECKING CIRCUIT FOR A MOTOR VEHICLE SAFETY DEVICE

[76] Inventors: Johann Spies, Schiesstätte 1c, 8068 Pfaffenhofen; Alfons Wöhrl, Sebastian-Kneipp-Str. 3, 8898 Schrobenhausen, both of Fed. Rep. of Germany

[21] Appl. No.: 345,363

[22] Filed: Feb. 3, 1982

Related U.S. Application Data

[63] Continuation of Ser. No. 12,369, Feb. 15, 1979.

[30] Foreign Application Priority Data

Mar. 2, 1978 [DE] Fed. Rep. of Germany ....... 2808872

[51] Int. Cl.³ .............................................. B60R 21/08
[52] U.S. Cl. .................................. 340/52 H; 180/274; 280/735; 340/61; 340/669
[58] Field of Search ................... 340/52 R, 52 H, 669; 307/10 R; 280/735; 180/274

[56] References Cited

U.S. PATENT DOCUMENTS

| | | | |
|---|---|---|---|
| 3,622,974 | 11/1971 | Best et al. | 340/53 |
| 3,629,816 | 12/1971 | Gillund | 340/61 |
| 3,851,305 | 11/1974 | Baba et al. | 340/52 H |
| 3,911,391 | 10/1975 | Held et al. | 340/52 H |
| 4,087,782 | 5/1978 | Oishi et al. | 280/735 X |

FOREIGN PATENT DOCUMENTS 2808872  9/1979  Fed. Rep. of Germany ...... 280/735

*Primary Examiner*—David L. Trafton
*Assistant Examiner*—Joseph Nowicki
*Attorney, Agent, or Firm*—Toren, McGeady and Stanger

[57] ABSTRACT

The invention relates to a releasing circuit for a motor vehicle safety device having a piezoelectric acceleration sensor for delivering a signal which corresponds to the sudden deceleration of a motor vehicle when it collides with an obstacle. An evaluating circuit evaluates the output signal of the acceleration sensors. A switch releases the safety device through an ignition element starting from a predetermined release value of the output signal of the evaluating circuit. A checking circuit for the releasing circuit has a check pulse generator for delivering check pulses which are fed to the releasing circuit. The checking circuit, in addition to the check pulse generator 11, is connected to a reference pulse generator 12 that provides reference pulses which assume characteristic values in accordance with the check pulses which are evaluated in the releasing circuit. A comparator 17 connected to the error indication 22 compares the evaluated check pulses and the reference pulses.

12 Claims, 4 Drawing Figures

RELEASING CIRCUIT AND CHECKING CIRCUIT FOR A MOTOR VEHICLE SAFETY DEVICE

This is a continuation of application Ser. No. 012,369, filed Feb. 15, 1979.

A releasing circuit of this type with a checking circuit is known from the German Offenlegungsschrift 22 22 038. In the releasing circuit described therein, the output signal of a piezoelectric acceleration sensor is fed to an integrator after amplification and is integrated starting from a lower threshold, the so-called integrand threshold. This integrand threshold corresponds to a maximum deceleration value which occurs during normal operation of the motor vehicle. In addition, an upper threshold is provided which cuts off the output signal starting from a value which corresponds to a very high acceleration. The purpose of this is to prevent the releasing circuit from delivering a release signal to the safety device when the acceleration sensor is subject to a very strong, but very brief deceleration, as it is the case, for example, when riding over rough roads.

Releasing circuits of this type must be continuously operative during the entire time of operation of the motor vehicle so that the safety device is indeed released only in the case of an accident and not as a result of an error in the releasing circuit. For this reason, according to the above-mentioned Offenlegungsschrift, the releasing circuit is provided with a checking circuit which always checks the operability of the releasing circuit when the motor vehicle is started. For this purpose, first the ignition element of the safety device is electrically isolated from the releasing circuit and, subsequently, two check pulses are successively fed to the releasing circuit. In this case, both check pulses are larger than the above-mentioned lower integrand threshold and only the second check pulse is dimensioned in such a way that, after processing in the releasing circuit, the release value for the ignition element of the safety device is exceeded. The output of the releasing circuit is connected to a comparator in which it is checked whether a signal appears at the output of the releasing circuit only after the second check pulse. If this is the case, it is assumed that the releasing circuit is intact and operative.

In such a check of the releasing circuit, the possibility cannot be excluded that the releasing circuit no longer functions satisfactorily, although the correct check pulse has passed the circuit without problems, since a distortion of the check pulse by components which possibly are defective, but have not yet failed, has not been checked. This must be taken into consideration especially when inexpensive components are to be used in the releasing circuit in order to achieve a production of the releasing circuit in large quantities. Of course, these inexpensive components cannot be rated as highly in respect to the uniformity of their parameters as expensive components which can only be used for pilot productions.

An object of the invention is to provide a releasing circuit with a checking circuit of the above-mentioned type, in which it can be correctly checked whether all of the components of the release device are still intact.

According to the invention, this object is accomplished by providing, in addition to the check pulse generator, a reference pulse generator that delivers reference pulses which assume characteristic values in accordance with the check pulses which are evaluated in the releasing circuit, and by connecting a comparator to the error indicator for comparing the evaluated check pulses and the reference pulses.

Consequently, according to the invention, it is not only checked whether a certain pulse is passed through the releasing circuit, but it is also possible, by comparing the values of the check pulses obtained in the releasing circuit with those of the reference pulses, to regularly scan the entire sensitivity range of the releasing circuit. In this manner, it can actually be determined whether all of the components of the releasing circuit are operable.

Advantageously, the releasing circuit is not only checked when the motor vehicle is started, but also frequently while the vehicle is moving in order to detect failures of the releasing circuit in time. For this purpose, the checking circuit has a clock pulse generator which is preferably switched on during the entire period when the releasing circuit is operable is. The clock pulse generation is connected to the clock pulse input of the check pulse generator and to an input of the reference pulse generator. Accordingly, the clock pulse generator controls the check pulse generator and the reference pulse generator so that the entire circuit is checked while the motor vehicle is moving.

In such a circuit, it must be ensured that the check operation of the releasing circuit is interrupted when the motor vehicle actually collides with an obstacle, so that the releasing circuit may be completely operable that time in order to release the safety device. This can be achieved by providing the priority circuit with an apparatus which, in the case that the evaluated check pulse assumes a value above a permissible limit, blocks the checking circuit at least for the next check pulse to be delivered. The checking circuit has, for example, a differential amplifier and a switch which are branched off from the input of the releasing circuit or from the output of the comparator of the checking circuit and which, when the check pulse assumes too high a value as a result of a superimposed output signal of the acceleration sensor, deliver at interrupt signal to the clock pulse generator. At this time, the duration of the check pulses are irrelevant, so that those check pulses can be used whose duration, in the case of a crash of the vehicle, is within the range of the length of the output signal of the acceleration sensor.

Another very simple possibility to make the releasing circuit ready for a possible accident of the motor vehicle is to make the duration of the check pulses significantly shorter than the output signals of the acceleration sensor which would occur when the motor vehicle collides with an obstacle. In this case, a special priority circuit is not required since the contribution of the very short check pulses to the release value of the releasing circuit is negligible in practice. Experiments have shown that, in the case of a crash of the vehicle, the passengers should be caught by the safety device after about 30 msec; when the activation time for the safety devices is assumed to be a period of time of 15 msec, the above-indicated requirement can be realized, for example, by using check pulses having a duration of one millisecond. Thus, they are effective only for 1/15 of the time which the output signal of the acceleration sensor requires after the evaluation to reach the release value. If, by chance, the check pulse and an output signal of the acceleration sensor should begin at the same time, the release time of the safety device is delayed, at most, by one millisecond. If it is assumed that a check pulse is delivered every 10 seconds, the probability a check pulse being delivered actually at the same time as the beginning of an output signal of the acceleration sensor is $10^{-4}$.

According to a preferred embodiment of the invention, the checking circuit has a selecting circuit which has an input connected to various switching points in the releasing circuit, wherein, in dependence on the check pulses, one of these switching points can always be connected through the selecting circuit to an input of the comparator. In this manner, the releasing circuit can be checked at various switching points so that a possible defect can also be localized very quickly.

An exemplary embodiment of the invention is explained in detail with reference to the drawing. In the drawing.

Figure 1:
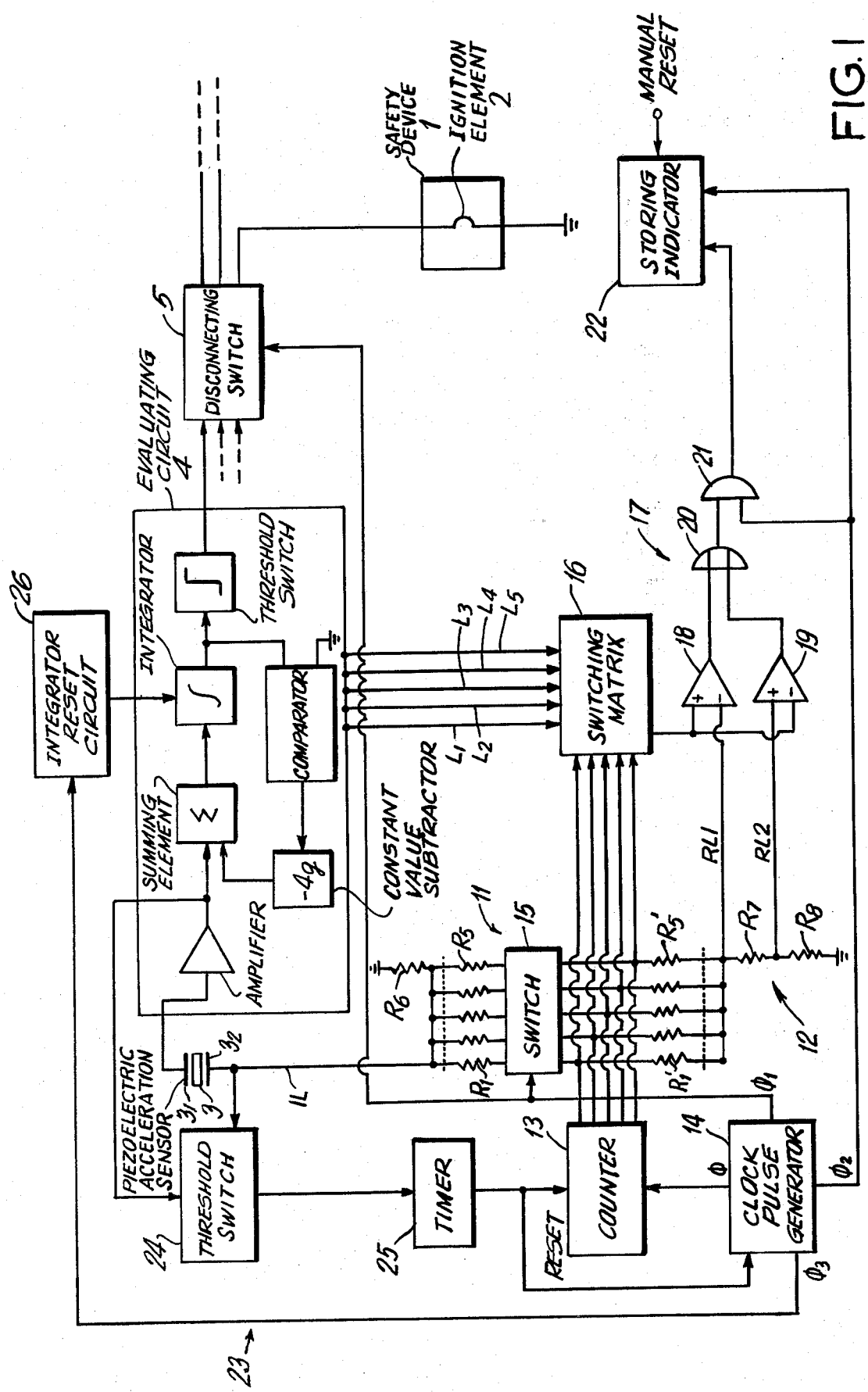
FIG. 1 shows a block diagram of a releasing circuit for a safety device with a checking circuit according to the invention.

In a motor vehicle, a releasing circuit only schematically shown in FIG. 1 releases a safety device 1 through an ignition element 2. An example of such a safety device is an air cushion or a seat belt. The releasing circuit has a piezoelectric acceleration sensor 3 with two electrodes $3_1$ and $3_2$, an evaluating circuit 4 and a disconnecting switch 5 which are connected in series with the ignition element 2. Generally, the releasing circuit releases several safety devices, for example, air cushions for the driver and the front passenger, as it is indicated in FIG. 1 by several dotted lines leading from the disconnecting switch 5.

An evaluating circuit 4 suitable for this purpose is known and described in more detail, for example, in applicant's German Auslegeschrift No. 24 54 424; this circuit consists essentially of an amplifier for the output signal of the sensor 3 with one or several bipolar threshold switches for determining the positive and negative threshold values of the signals to be evaluated, an integrater to which, through a summing element, the output signal of the amplifier is delivered reduced by a lower threshold value in accordance with, for example, $-4$ g (g=acceleration due to gravity), and a release switch, these elements being schematically shown in FIG. 4 in the form of symbols. The disconnecting switch 5 is usually closed so that the evaluating circuit 4 is connected to the ignition element 2. When the motor vehicle collides with an obstacle, the acceleration sensor 3 generates an electric signal which is picked up at the electrode $3_1$ and is delivered to the amplifier of the evaluating circuit. The output signal, reduced by the lower threshold value determined in the summing element, is integrated. The lower threshold value shall hereinafter be called a lower integrand threshold. As soon as the output signal of the integrator reaches a release value determined by the subsequent release switch, the latter ignites the ignition element 2 and actuates the safety device.

For checking the releasing circuit, a checking circuit is provided which has a check pulse generator 11 and a reference pulse generator 12 for generating, in this case always 5, check and reference pulses. The two generators have a common counter 13 which is triggered by a clock pulse generator 14 with the clock pulse $\Phi$; the counter 13 is, for example, a ring counter. Five counter outputs are connected to corresponding parallel inputs of a controllable switch 15 of the check pulse generator. The switch 15 has five parallel outputs which are connected to resistors R1, R2, R3, R4 and R5 which each have different resistance values and, in turn, form a voltage divider together with a common resistor R6 which is connected to chassis. From the center of this voltage divider, a pulse line IL leads to the electrode $3_2$ of the acceleration sensor. The switch 15 is controlled by the clock pulse generator 14 with a clock pulse $\Phi_1$ in such a manner that each counter pulse appearing at the counter output is allowed to pass for a certain period and its amplitude is determined in accordance with the respective resistance value of the resistors R1 through R5. When the check pulse generator is switched on, by way of the resistors R1 through R5, successively five check pulses I1 through I5 (see FIG. 2) whose amplitudes and durations have been determined are delivered to the evaluating circuit 4 through the piezoelectric acceleration sensor 3. From various switching points, not shown, of the evaluating circuit 4, five check lines L1 through L5 lead to a switching matrix 16 in the checking circuit, the switching matrix 16 being addressable by the output signals of the counter 13. The output of the switching matrix is connected to a comparator 17 which consists of two differential amplifiers 18 and 19, an OR gate 20 and and AND gate 21. The output of the switching matrix 16 is connected to the positive input of the differential amplifier 18 and to the negative input of the differential amplifier 19; the output of the amplifiers are connected to the two inputs of the OR gate 20. The output of OR gate 20 is, in turn, connected to an input of the AND gate 21. The second input of the AND gate receives the clock pulse $\Phi_2$ from the clock pulse generator 14.

The reference pulses are also generated from the five counter output pulses through five resistors R1', R2', R3', R4' and R5' in the respective output lines. The low ends of these resistors are connected in common and, through a first reference line RL1, are connected to the second, negative input of the first differential amplifier 18 in the comparator 17. From the low ends of the resistors, a voltage divider composed of two resistors R7 and R8 is connected to chassis, its center being connected to the positive input of the second differential amplifier 19 in the comparator 17 through a second reference line RL2. The resistors R7 and R8 of the voltage divider are dimensioned in such a manner that the reference pulses in the reference lines RL1 and RL2 define a tolerance range about an average value, the average value being determined by a value which corresponds to that check pulse which is evaluated in the evaluating circuit 4 when the evaluating circuit is functioning under normal operating conditions.

In the above-indicated circuit, the output pulses of the counter 13 are treated as follows; only the counter pulse appearing at the first output being considered:

The first counter pulse is delivered to the first input of the controllable switch 15, and, controlled by the clock pulse $\Phi_1$, is allowed to pass for a certain duration. Its amplitude is determined by the resistor R1. Subsequently it is delivered as a check pulse I1 to the evaluating circuit 4 through the piezoelectric sensor 3;

The check pulse evaluated in the evaluating circuit 4 is delivered to the switching matrix 16 through the check line L1; furthermore, the first counter pulse is transformed into two simultaneous corresponding reference pulses by the resistor R1' and the voltage divider R7, R8, the duration of the reference pulse being determined by the duration of the counter pulse and being larger than the duration of the check pulse, and is delivered to the differential amplifiers 18 and 19 through the reference lines RL1 and RL2; further, the first counter pulse is delivered to the addressable switching matrix 16 which, as a result, connects the check line L1 to the comparator 17.

The additional counter pulses are treated accordingly.

The checking cycle of the checking circuit for the evaluating circuit takes place as follows: after the motor vehicle has been started, the operation of the checking and evaluation circuits is delayed for a start-up phase of, for example, 10 seconds; after this time period, the battery voltage is free of transients since it is no longer influenced by high current devices (for example, starter) and the individual circuit components assume their normal functional operating states; for example, the condensors are charged and integrators are reset. Subsequently, the clock pulse generator 14 begins to operate whereby, as described above, the two generators 11 and 12 at the switching matrix 16 are triggered by the first counter pulse. Accordingly, the comparator 17 is supplied with a check pulse which has been conducted through the check line L1 and has been evaluated in the evaluating circuit 4 up to a certain switching point, for example, to a point behind the integrator; the comparator 17 is also supplied with reference pulses which determine the permissible tolerance range of the evaluated check pulse and are conducted through the reference lines RL1 and RL2. If the evaluating circuit is intact up to the checking point under consideration, the evaluated checking pulse is within the predetermined tolerance range, so that no signals appear at the output of the differential amplifiers 18 and 19. Accordingly, the OR gate 20 and the AND gate 21 do not switch through. As a result, no error signal appears at a storing indication L2 which is connected to the output of the AND gate and is controlled by the clock pulse $\Phi_2$.

The manner of function of the checking circuit is repeated for all check pulses I1 through I5 in the above-described manner.

When one of the evaluated check pulses delivered through the check lines L1 through L5 to the comparator 17 is outside of the tolerance range determined by the reference pulses, an error signal appears at the output of one of the differential amplifiers 18 or 19, so that the OR gate 20 switches through. The AND gate 21 which is activated during the checking period by the clock pulse signal $\Phi_2$ passes the error signal to the indicator 22 which is also activated during the checking time where the signal is indicated and stored. Accordingly, the clock pulse signal $\Phi_2$ prevents the indication of unwanted signals which could occur outside of the checking time.

The indication can be manually reset in order to cancel the indication and, thus, make it free for a new check.

As a rule, in the above-described check of the releasing circuit, the evaluated check pulse does not reach the release value for the safety device; however, should the evaluated check pulses exceed this value, the above-mentioned disconnecting switch 5 is opened by an appropriate signal and, thus, the ignition element 2 is separated from the evaluating circuit 4. For reasons of safety, this separation can also be performed in any check pulse, for example, by the clock pulse signal $\Phi_1$.

Figure 2:
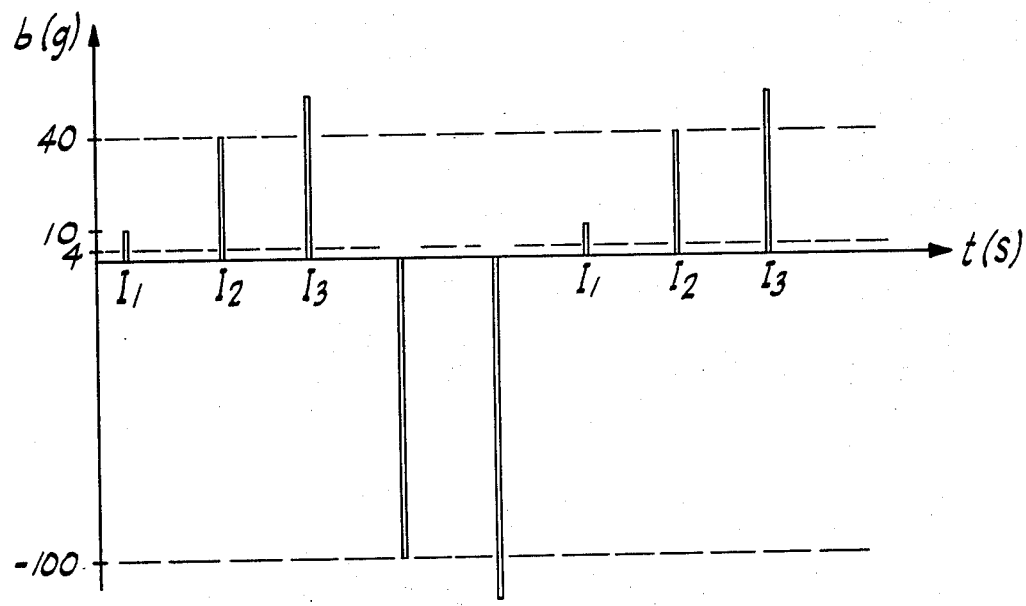
FIG. 2 shows a pulse diagram illustrating the checking cycle.

In FIG. 2, the checking cycle is once again explained in detail: the check pulses $I_1$ through $I_5$ are plotted on the time axis with an amplitude which is proportional to the acceleration due to gravity g. Parallel to the time axis, three broken lines are drawn which correspond to 4 g, 40 g and −100 g, wherein the value 4 g corresponds to the above-mentioned lower integrand threshold, the value 40 g corresponds to the upper integrand threshold and the value −100 g corresponds to a negative integrand threshold which are obtained in the above-mentioned bipolar threshold value switch of the evaluating circuit 4. Accordingly, a positive output signal of the piezoelectric acceleration sensor is integrated only between the values 4 g and 40 g, whereas a negative output signal is integrated up to the value −100 g. These thresholds have been set as a result of the consideration that short high-frequency accelerations, for example, due to rough roads, have very high positive and negative values which may possibly result in a release of the safety device when they are not cut off. The asymmetrical arrangement of the positive and negative threshold values result from the fact that, in short high-frequency signals, the first positive rise is usually much longer than the following negative portion of the wave train; it is now the object to reset the integrator in the evaluating circuit as quickly as possible to the value 0, in order to process, if possible, without delay any output signals of the acceleration sensor which correspond to an actual crash of the vehicle. Due to the selection of the asymmetrical thresholds, the integrated values of the positive and the negative wave train are about equal, so that the integrator is reset to the value ZERO after the positive and the subsequent negative wave train.

The check pulses I1 through I5 are delivered in regular time intervals of about 10 seconds which are predetermined by the clock pulse generator 14. The first check pulse I1, for example, has an amplitude corresponding to an acceleration of 10 g. The switching point in the evaluating circuit which is to be evaulated is, for example, as mentioned above, before the input of the integrator so that the pulse which is integrated between the values 4 g and 10 g is delivered to the comparator 17 through the check line L1 and the switching matrix 16. In accordance with the tolerance range, the corresponding reference pulses are above or below the integrated value of the first check pulse between the given acceleration limits. When the evaluated check pulse is in the tolerance range of the reference pulses, it is confirmed that the lower threshold corresponding to an acceleration of 4 g is intact and that also the remaining components of the evaluating circuit up to the integrator function satisfactorily. The second check pulse has, for example, an amplitude corresponding to the upper positive threshold of 40 g; the checking point in the evaluating circuit 4 which is connected to the check line L2 may be either after the output of the bipolar threshold value switch or also after the output of the amplifier. However, the second reference pulse must also be dimensioned accordingly.

The third check pulse is above the upper threshold which corresponds to 40 g; the evaluated check pulse delivered to the comparator through the check line L3 must have the same value as the evaluated second check pulse 12 when the upper threshold according to 40 g is intact; accordingly, the third reference pulses are also equal to the second pulses. As with the check pulses I2 and I3, the check pulses I4 and I5 check the negative threshold which corresponds to a value of −100 g. The check pulse I4 therefore has an amplitude corresponding to the negative threshold and the check pulse I5 has an amplitude larger than the negative threshold. Also in this case, the evaluated check pulses must be equal.

Subsequently, the described checking cycle is repeated. The check pulses mentioned herein are only exemplary; for example, directly at the input of the evaluating circuit that would also be a checking point in order to, thus, determine possible defects of the piezoelectric acceleration sensor. The piezoelectric acceleration sensor has, if it is intact, a certain capacity which changes the check pulses in a predetermined manner. When irregularities, for example, cracks, occur in the piezoelectric material or at the contact surface between this material and the electrodes, the check pulse which is allowed to pass has a distortion which can be confirmed by an appropriate reference pulse.

Figure 3A:
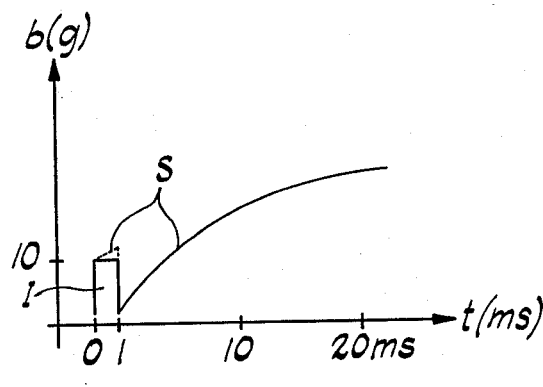
FIG. 3a shows the superposition of a check pulse by an output signal of an acceleration sensor of the releasing device during an accident of the motor vehicle, the check pulse having a duration of one millisecond.
Figure 3B:
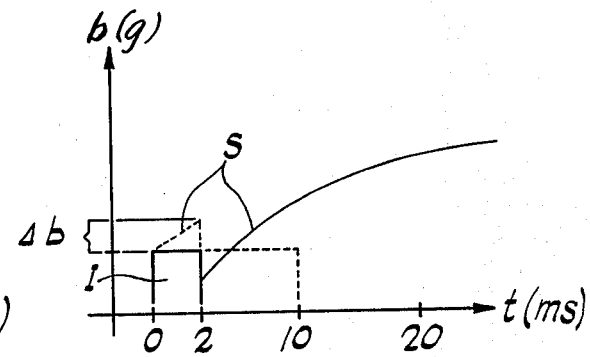
FIG. 3b shows an illustration similar to FIG. 3a, however, wherein the check pulse has a duration of ten milliseconds.

The check pulses shown in FIG. 2 are either very short pulses of, for example, one millisecond, see FIG. 3a, or longer check pulses of, for example, 10 msec., see FIG. 3b. As already mentioned above, it may be the case, even though with small probability, that a check pulse is delivered just at the beginning of an output signal S of the releasing circuit resulting from an actual crash of the motor vehicle. When the switch 5 is open during the check of the releasing circuit, the integration of the output signal S is delayed, at most, by the duration of the check pulse of one millisecond which, in view of the total time of about 30 msec until the safety device is actuated, is a period of time which is negligibly short.

In the case of a longer check pulse of about 10 msec, the output signal S', see FIG. 3b, may exceed the lower threshold value corresponding to 4 g already during the duration of the check pulse and may reach the release value for the safety device even during the duration of the check pulse. In order to prevent the safety device from being actuated too late a priority circuit 23 is provided which essentially is a comparing circuit with pulse output and comprises a threshold value switch 24 with a threshold value Δb, a timer 25 with a time constant corresponding to the maximum admissible delay for the evaluation of an actual signal resulting from an accident of the sensor 3, and a resetting circuit 26 for the integrator in the evaluating circuit 4. One input of the priority circuit, i.e., an input of the threshold value switch 24, serves as reference input and is connected to the pulse line IL, while the other input of the priority circuit is connected, for example, to a point after the output of the amplifier in the evaluating circuit 4. The two inputs of the priority circuit 21 are standardized in such a manner that a subtraction of the two inputs results in a ZERO-SIGNAL. When, as it is shown in FIG. 3b, an output signal S' of the acceleration sensor is superimposed to the check pulse, the signal increases at the second input of the threshold value switch 24, so that the difference at both inputs becomes positive, thereby activating the timer 25. When, even after the time constant of the time timer 25, this difference reaches a threshold which corresponds to an acceleration Δb, at the output of the priority circuit there appears an interrupt signal which is delivered to reset inputs of the counter 13 and the clock pulse generator 14 resulting in an immediate interruption of the checking cycle. In addition, the integrator in the evaluating circuit 4 is reset through the reset circuit 26 by a clock pulse signal $\Phi_3$ and, subsequently, also the switch 5 in the releasing circuit is closed by $\Phi_1$, so that the entire releasing circuit is ready for processing the output signal S' of the acceleration sensor.

As illustrated in FIG. 3b the check pulse terminates after two miliseconds and, as also shown in broken lines, does not last 10 msec. The above-mentioned threshold Δb can be chosen, for example, to correspond to an acceleration value of 4 g, so that there is practically no delay at all in the release of the safety device, since an output signal resulting from an accident of the motor vehicle is also only integrated starting from the value corresponding to 4 g.

Furthermore, it shall be pointed out that the above-indicated circuit for the checking circuit is an exemplary block diagram; the circuit is advantageously realized by a single freely programmable logic unit on which there are integrated the counter 13, clock pulse generator 14, check pulse and reference pulse generators 11 and 12, switching matrix 16 and comparator 17. Of course, an arrangement with individual switching elements is also possible in which case, for example, the generators 11 and 12 can also be realized by shift registers.

In addition, the checking circuit can, of course, also be expanded and be used for additionally checking the ignition element or other components of the circuit, so that all those parts of the releasing circuit of the safety device which are subject to failure are monitored.

We claim:

1. Releasing circuit for a safety device in motor vehicles, of the type wherein an acceleration sensor provides a signal which corresponds to the deceleration of the motor vehicle when it collides with an obstacle, wherein an evaluating circuit evaluates the output signal of said acceleration sensor, and wherein a switch which, starting from a certain release value of an output signal of said evaluating circuit releases said safety device through an ignition element, and a checking circuit for said releasing circuit with a check pulse generator for providing of check pulses for said evaluating circuit, and an error indicating device connected to said checking circuit, the improvement wherein said checking circuit comprises a reference pulse generator means for providing reference pulses which assume characteristic values corresponding to the check pulses, and a comparator means connected to said error indicating device for comparing the check pulses passing through said evaluating circuit and the reference pulses and wherein means for supplying clock pulses is provided, said check pulse generator comprising a controllable switch operating under control of said clock pulses.

2. Releasing circuit for a safety device in motor vehicles, of the type wherein an acceleration sensor provides a signal which corresponds to the deceleration of the motor vehicle when it collides with an obstacle, wherein an evaluating circuit evaluates the output signal of said acceleration sensor, and wherein a switch which, starting from a certain release value of an output signal of said evaluating circuit releases said safety device through an ignition element, and a checking circuit for said releasing circuit with a check pulse generator for providing of check pulses for said evaluating circuit, and an error indicating device connected to said checking circuit, the improvement wherein said checking circuit comprises a reference pulse generator means for providing reference pulses which assume characteristic values corresponding to the check pulses, and a comparator means connected to said error indicating device for comparing the check pulses passing through said evaluating circuit and the reference pulses and wherein said reference pulse generator means has two outputs connected to said comparator means for simultaneously delivering two reference pulses which are each assigned to a single check pulse and assume values above and below the characteristic values of the check pulses evaluated in said evaluating circuit for determining a permissible tolerance range for the evaluated check pulses.

3. Circuit according to claim 3, wherein said comparator means comprises first and second differential amplifiers each having first and second inputs and an output, one output of said reference pulse generator being connected to one of said inputs of said first differential amplifier and the other output of said reference pulse generator being connected to an input of said second differential amplifier of opposite sense to said one input of said first differential amplifier, the check pulses evaluated in said evaluating circuit being connected to the second inputs of said differential amplifiers.

4. Circuit according to claim 1, wherein said checking circuit comprises an addressable selecting circuit, means for connecting the selecting circuit to various switching points in said releasing circuit, and means operating in dependence on the check pulses for connecting each of said switching points separately to said comparator means through said selecting circuit.

5. Circuit according to claim 4, wherein said selecting circuit comprises a counter and a switching matrix addressed by said counter, parallel inputs of said switching matrix being connected through check lines to said various switching points in said releasing circuit.

6. Circuit according to claim 1, wherein said clock pulse supplying means of said checking circuit is switched on during the entire operating period of said releasing circuit and controls the delivery of the check and reference pulses and the operability of said comparator means, said means for supplying clock pulses being connected to clock pulse inputs of said check pulse generator and said reference pulse generator means and to an enabling input of said comparator.

7. Circuit according to claim 6, wherein said check pulse generator comprises a first plurality of resistors each corresponding to a different magnitude check pulse, wherein said reference pulse generator comprises a second plurality of resistors each corresponding to a different magnitude reference pulse, and wherein said checking circuit comprises a counter connected to said means for supplying clock pulses, outputs of said counter being connected through a switch means in said check pulse generator controlled by said clock pulse generator to sequentially select the resistors of said first plurality of resistors for obtaining the check pulses, said counter being connected to said reference pulse generator, said second plurality of resistors generating reference pulses, and said counter sequentially providing address inputs to an addressable switching matrix connecting said comparator to the check pulses from said evaluation circuit.

8. Circuit according to claim 1, wherein said checking circuit comprises means for providing the check pulses in certain time intervals which are significantly longer than the duration of the check pulses in other time intervals, the duration of said check pulses being significantly shorter than the output signal of said acceleration sensor which occur when said motor vehicle collides with an obstacle.

9. Releasing circuit for a safety device in motor vehicles, of the type wherein an acceleration sensor provides a signal which corresponds to the deceleration of the motor vehicle when it collides with an obstacle, wherein an evaluating circuit evaluates the output signal of said acceleration sensor, and wherein a switch which, starting from a certain release value of an output signal of said evaluating circuit releases said safety device through an ignition element, and a checking circuit for said releasing circuit with a check pulse generator for providing of check pulses for said evaluating circuit, and an error indicating device connected to said checking circuit, the improvement wherein said checking circuit comprises a reference pulse generator means for providing reference pulses which assume characteristic values corresponding to the check pulses, and a comparator means connected to said error indicating device for comparing the check pulses passing through said evaluating circuit and the reference pulses and further comprising a priority circuit means responsive to a controlled check pulse in said releasing circuit exceeding a value above a permissible limit for disabling said checking circuit at least for the next check pulse to be delivered and for releasing the releasing circuit.

10. Circuit according to claim 9, wherein said priority circuit comprises a differential threshold value switch having one input connected to an output of said check pulse generator and having a second input connected to a switching point of said releasing circuit which determines the permissible limit, and wherein the output of said threshold value switch is connected through a timer to an interrupt input of said checking circuit.

11. Circuit according to claim 1, wherein said check pulse generator is connected to said releasing circuit through said acceleration sensor.

12. Circuit according to claim 3, further comprising an OR gate and an AND gate, wherein the outputs of said differential amplifiers are connected through said OR gate to an input of said AND gate, means for enabling the AND gate during the check pulses, said AND gate having an output being connected to said error indicating device, said error indicating device being enabled during a check operation.

* * * * *